United States Patent [19]

Kawabe et al.

[11] 4,089,530
[45] May 16, 1978

[54] PHONOGRAPHIC STYLUS

[75] Inventors: Hirokazu Kawabe; Hiroshi Tanabe, both of Tokyo, Japan

[73] Assignee: Kabushiki Kaisha Nagaoka, Tokyo, Japan

[21] Appl. No.: 753,186

[22] Filed: Dec. 22, 1976

[30] Foreign Application Priority Data

Oct. 6, 1976 Japan .................................. 51-120107

[51] Int. Cl.² .............................................. G11B 3/02
[52] U.S. Cl. .................................................... 274/37
[58] Field of Search ................ 274/37; 179/100.41 K, 179/100.41 D, 100.41 M

[56] References Cited

U.S. PATENT DOCUMENTS

| 3,294,405 | 12/1966 | Pritchard | 274/37 |
| 3,538,266 | 11/1970 | Cho | 274/37 |
| 3,576,955 | 5/1971 | Obata | 179/100.41 M |
| 3,641,284 | 2/1972 | Westerkamp | 179/100.41 K |
| 3,761,647 | 9/1973 | Nemoto et al. | 179/100.41 K |
| 3,908,096 | 9/1975 | Furuya | 179/100.41 K |
| 4,009,885 | 3/1977 | Pritchard | 274/37 |

Primary Examiner—Steven L. Stephan
Attorney, Agent, or Firm—James E. Nilles

[57] ABSTRACT

A phonographic stylus comprising a stylus knob for record player and a holder, to which holder is attached a cantilever having a stylus tip. Said stylus knob and said holder are integrally formed of the same material. In said holder is formed integrally a damper.

7 Claims, 8 Drawing Figures

PHONOGRAPHIC STYLUS

This invention relates to a phonographic stylus to be fitted in a cartridge for record player.

Phonographic styli of this sort generally have a stylus knob and a holder extending rearward from the stylus knob. Conventionally, a metallic holder is attached to a synthetic resin stylus knob in such a manner that the holder is inserted in the stylus knob and then an injection molding is applied.

In such phonographic styli, however, the stylus knob and the holder are different in resonance frequency and the frequency of the metallic holder becomes high, resulting in the generation of noise at the time of sound reproducing, which is undesirable.

In general, moreover, in phonographic styli of this sort, an inside holder is set within the holder which extends rearward from the stylus knob, and within the inside holder is mounted a rubber-molded damper, to which is attached a cantilever having a stylus tip.

In the conventional method of monting the damper within the inside holder, the damper is forced in the inside holder, so that a uniform close contact throughout the contact surface between the inner surface of the inside holder and the outer surface of the damper is not attained and the frontback vibration of the cantilever occurring at the time of sound reproducing causes the generation of strain. Furthermore, since the damper is forced in the holder in a condition such that the outside diameter of the damper is larger than the inside diameter of the holder, a distortion of the entire damper results. Such strain and distortion of the damper causes an acoustic strain at the time of sound reproducing, which is undesirable.

It is an object of the invention to provide a phonographic stylus having a stylus knob and a holder, in which the stylus knob and the holder are integrally formed of the same material, for example, a synthetic resin, whereby the vibration of the holder itself is eliminated and the resonance frequency of the whole is lowered so as to reduce noise at the time of sound reproducing.

It is another object of the invention to eliminate an acoustic strain at the time of sound reproducing by inserting a damper material in the inside holder and subsequently molding the damper by using said inside holder as a part of the mold for the damper whereby the damper is contacted with the inside holder closely and uniformly throughout the whole surface of the inside holder without distortion.

Other objects and features of the present invention will become apparent from the following description taken in connection with the accompanying drawings, in which.

Figure 1:
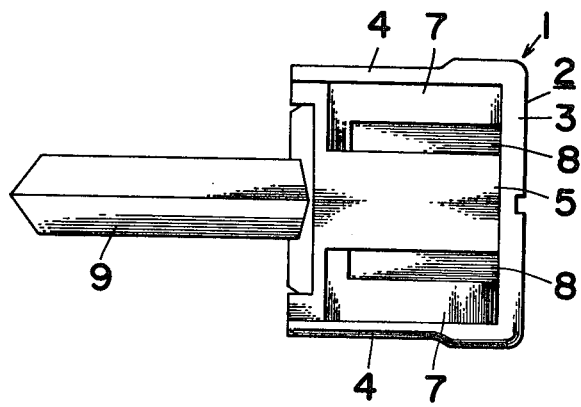
FIG. 1 is a plan view showing an embodiment of the phonographic stylus of the invention.
Figure 2:
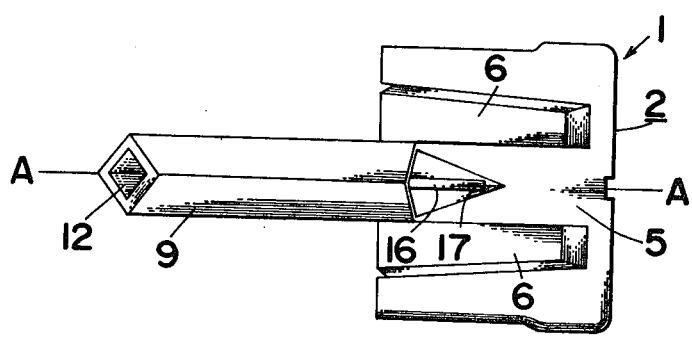
FIG. 2 is a bottom view thereof.
Figure 3:
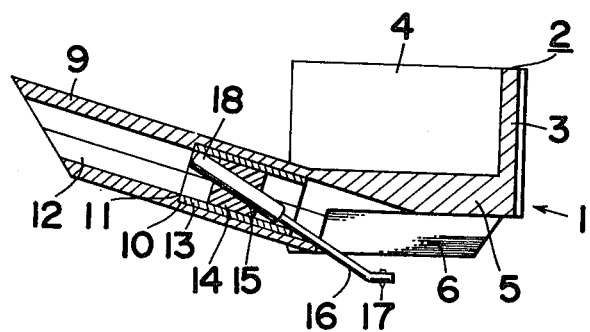
FIG. 3 is a sectional view taken on line A—A of FIG. 2.

A phonographic stylus 1 is provided with a stylus knob 2. The stylus knob 2 has a front wall portion 3, both side wall portions 4 and a bottom wall portion 5 and is in the form of a frame with its rear face and upper face portions opened. On the lower face of the bottom wall portion 5 are provided a pair of projections 6 so that the projections 6 are positioned on both sides leaving space at the central portion. On the other hand, on the upper face of the bottom wall portion 5 are provided concave portions 7 so that the concave portions 7 are positioned on both sides leaving space at the central portion. Further, in the concave portions 7 on both sides are formed recesses 8 in correspondence with the projections 6. To the central portion of the rear end of the bottom wall portion 5 of the stylus knob 2 is attached a tubular holder 9 having a square section so that the holder 9 extends from between the pair of projections 6 slantwise upward in the direction of the rear. Within the holder 9 is formed an inner hole 10 having a square section and communicating with the portion between the pair of projections 6. Adjacent the rear part of the inner hole 10 is provided a small-diameter portion 12 via a stepped portion 11. The stylus knob 2 and the holder 9 are integrally formed of a non-magnetic, synthetic resin such as ABS, polystyrol and acryl resin by means of injection molding or hot pressing.

In the inner hole 10 of the holder 9 is fitted a tubular, inside holder 13 having a square section homologous to the shape of the inner hole 10. Within the inside holder 13 is intermediately mounted a rubber damper 14, in which is formed a mounting hole 15 slantwise upward in the direction of the rear. In the mounting hole 15 is fitted and supported the rear part of a cantilever 16. To the lower portion of the tip end of the cantilever 16 is attached a stylus tip 17, while to the rear end portion of the cantilever 16 is attached a permanent magnet 18.

The inner surface of the inside holder 13 is treated so that the bonding thereof with rubber is made easily, and in the inside holder 13 is inserted an unaged rubber as a damper material. Then, the mold of the mounting hole 15 is inserted and the rubber is aged and thus molded within the inside holder 13, allowing the reaction with the treated inner surface to proceed.

Figure 4:
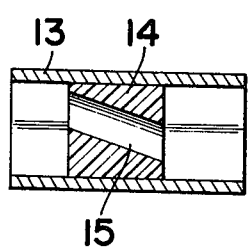
FIG. 4 is an enlarged sectional view of the inside holder and the damper.
Figure 5:
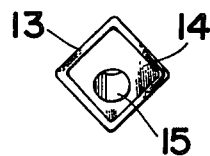
FIG. 5 is a front view thereof.
Figure 6:
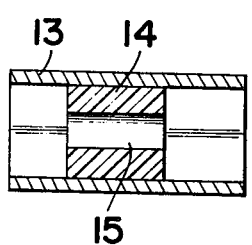
FIG. 6 is an enlarged sectional view showing another embodiment of the holder and the damper.
Figure 7:
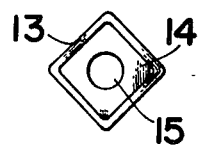
FIG. 7 is a front view thereof.

The mounting hole 15 in the damper is formed slantwise as shown in FIGS. 4 and 5. Alternatively, it may be formed horizontally as shown in FIGS. 6 and 7 and to it may be horizontally attached the cantilever 16.

Figure 8:
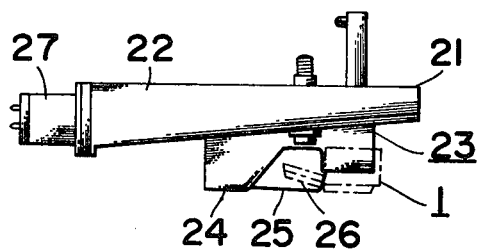
FIG. 8 is a side view of the pickup portion for record player to which is to be attached the phonographic stylus of the invention.

Then, as shown in FIG. 8, the phonographic stylus 1 is mounted in a pickup 21 for record player. The pickup 21 is provided with a rectangular head shell 22 which has an open lower surface, to which is attached a cartridge 23 as an electric converter portion. The cartridge 23 has a cartridge body 24, within which is provided a shielding case 25. Formed rearwardly upward from the front end of the shielding case 25 is a fitting hole 26 having a square section in which is to be fitted the holder 9. To the shielding case 25 is attached a converter element (not shown). Further, to the rear end of the head shell 22 is attached a terminal 27 which is in contact with the said converter element. The head shell 22 is connected to the tone arm through the terminal 27.

In mounting the phonographic stylus 1 as a vibration part in the cartridge 23, the holder 9 is fitted in the fitting hole 26 of the shielding case 25 and at the same time the stylus knob 2 is fitted in the lower portion of the front end of the cartridge body 24.

In working the present invention, the shape of the stylus knob 2 is not limited to the one shown, and the paired projections 6, concave portions 7 and recesses 8 may not be provided. In addition to a tubular shape having a square section of the holder 9, a shape having a cylindrical section may also be adopted and in this case the inside holder 13 may have the corresponding section. Furthermore, the bore of the holder 9 may be formed in the same diameter without providing the small-diameter portion 12 adjacent the inner hole 10 via the stepped portion 11.

What is claimed is:

1. A phonographic stylus to be fitted in a cartridge for a record player comprising: a stylus knob having an integrally formed rearwardly extending holder, said holder having an inner hole therein, said stylus knob being formed of non-magnetic material, a stylus cantilever having a rear end and a stylus tip, and means for attaching said stylus cantilever to said holder, said means comprising an inside hollow holder supported in said inner hole of said holder, and a damper having a mounting hole therein for receiving and supporting said rear end of said stylus cantilever, said damper being molded in place within said inside hollow holder, whereby said damper makes close and uniform distortionless contact with the interior of said inside hollow holder.

2. A phonographic stylus to be fitted in a cartridge for a record player comprising: a stylus knob having an integrally formed rearwardly extending hollow holder, said holder having an inner hole therein, said stylus knob being formed of non-magnetic material, a stylus cantilever having a rear end and a stylus tip, and means for attaching said stylus cantilever to said holder, said means comprising an inside hollow holder located in said inner hole of said hollow holder, and a damper having a mounting hole therein for supporting said stylus cantilever, said damper being molded in place within said inside hollow holder, whereby said damper makes close and uniform distortionless contact with the interior of said inside hollow holder.

3. A phonographic stylus according to claim 2 wherein said mounting hole is substantially parallel to said inner hole in said hollow holder of said stylus knob.

4. A phonographic stylus according to claim 2 wherein said mounting hole is slanted relative to said inner hole in said hollow holder of said stylus knob.

5. A phonographic stylus according to claim 2 wherein said inner hole in said hollow holder of said stylus knob is of non-circular cross-sectional configuration and wherein said hollow inside holder has an exterior cross-sectional configuration which is homologous to that of said inner hole.

6. A phonographic stylus according to claim 5 wherein said inner hole has a square cross section and configuration.

7. A phonographic stylus according to claim 5 wherein said stylus knob includes a bottom wall portion, a front wall portion, and a pair of spaced apart side wall portions extending upwardly from said bottom wall portion and wherein said hollow holder extends from the rear end of said bottom wall portion whereby said stylus cantilever is supported on said stylus knob in a position where said rear end portion of said stylus cantilever is inside said inner hole of said hollow holder and said stylus tip is disposed outside said inner hole and adjacent and spaced from said bottom wall of said stylus knob.

* * * * *